United States Patent
Chang et al.

(10) Patent No.: US 11,485,020 B2
(45) Date of Patent: Nov. 1, 2022

(54) ROBOTIC SYSTEM HAVING NON-PLANAR INNER PROJECTION OF MOVABLE MECHANISM

(71) Applicant: NUWA ROBOTICS (HK) LIMITED, Taipei (TW)

(72) Inventors: Ming-Sheng Chang, Taipei (TW); Chi-Hao Pai, Taipei (TW)

(73) Assignee: NUWA ROBOTICS (HK) LIMITED, Taipei (TW)

( * ) Notice: Subject to any disclaimer, the term of this patent is extended or adjusted under 35 U.S.C. 154(b) by 220 days.

(21) Appl. No.: 17/038,588

(22) Filed: Sep. 30, 2020

(65) Prior Publication Data
US 2021/0154855 A1  May 27, 2021

(30) Foreign Application Priority Data
Nov. 22, 2019  (TW) ................................ 108142599

(51) Int. Cl.
  *B25J 9/16* (2006.01)
  *B25J 9/12* (2006.01)

(52) U.S. Cl.
  CPC .............. *B25J 9/1697* (2013.01); *B25J 9/12* (2013.01)

(58) Field of Classification Search
  CPC ........... B25J 9/1697; B25J 9/12; G03B 21/10; G03B 21/562; G03B 21/00; G03B 21/56
  USPC ................. 700/245–264; 318/568.11–568.25
  See application file for complete search history.

(56) References Cited

U.S. PATENT DOCUMENTS

| | | | | |
|---|---|---|---|---|
| 6,994,437 B2 * | 2/2006 | Suzuki | ............... | G02B 17/0852 348/E5.142 |
| 7,035,453 B2 * | 4/2006 | Liu | ........................ | H04N 19/61 715/757 |
| 8,036,775 B2 * | 10/2011 | Matsumoto | ............ | G06N 3/008 700/255 |
| 8,137,205 B2 * | 3/2012 | Cortelyou | .............. | A63G 31/00 472/60 |
| 8,646,918 B2 * | 2/2014 | De Paor | ................. | G03B 21/56 353/62 |
| 8,926,441 B2 * | 1/2015 | Fox | ........................... | E04H 3/30 472/75 |
| 9,097,968 B1 * | 8/2015 | Acevedo | ............... | H04N 13/398 |
| 9,652,049 B2 * | 5/2017 | Song | ...................... | G06F 3/0202 |
| 9,764,467 B2 * | 9/2017 | Harada | ................... | B25J 9/1612 |
| 10,423,059 B2 * | 9/2019 | Nashida | .................. | G09G 5/00 |

(Continued)

*Primary Examiner* — Jaime Figueroa
(74) *Attorney, Agent, or Firm* — Jeenam Park

(57) ABSTRACT

A robotic system having movable mechanism of a non-planar inner projection is provided. It comprises a non-planar projection surface, a servo motor, an inner projection element, and a support frame. The servo motor is connected to the non-planar projection surface, and the non-planar projection surface can be rotated synchronously by the servo motor drive. The inner projection element is disposed relative to the non-planar projection surface, the inner projection element generates a target image, and the target image is projected onto the non-planar projection surface to form a display area, and the display area has a fixed boundary. The servo motor and the inner projection element are disposed on the support frame, and when the non-planar projection surface is synchronously rotated by the servo motor, the inner projection element also rotates synchronously.

16 Claims, 2 Drawing Sheets

(56) References Cited

U.S. PATENT DOCUMENTS

Figure 1:
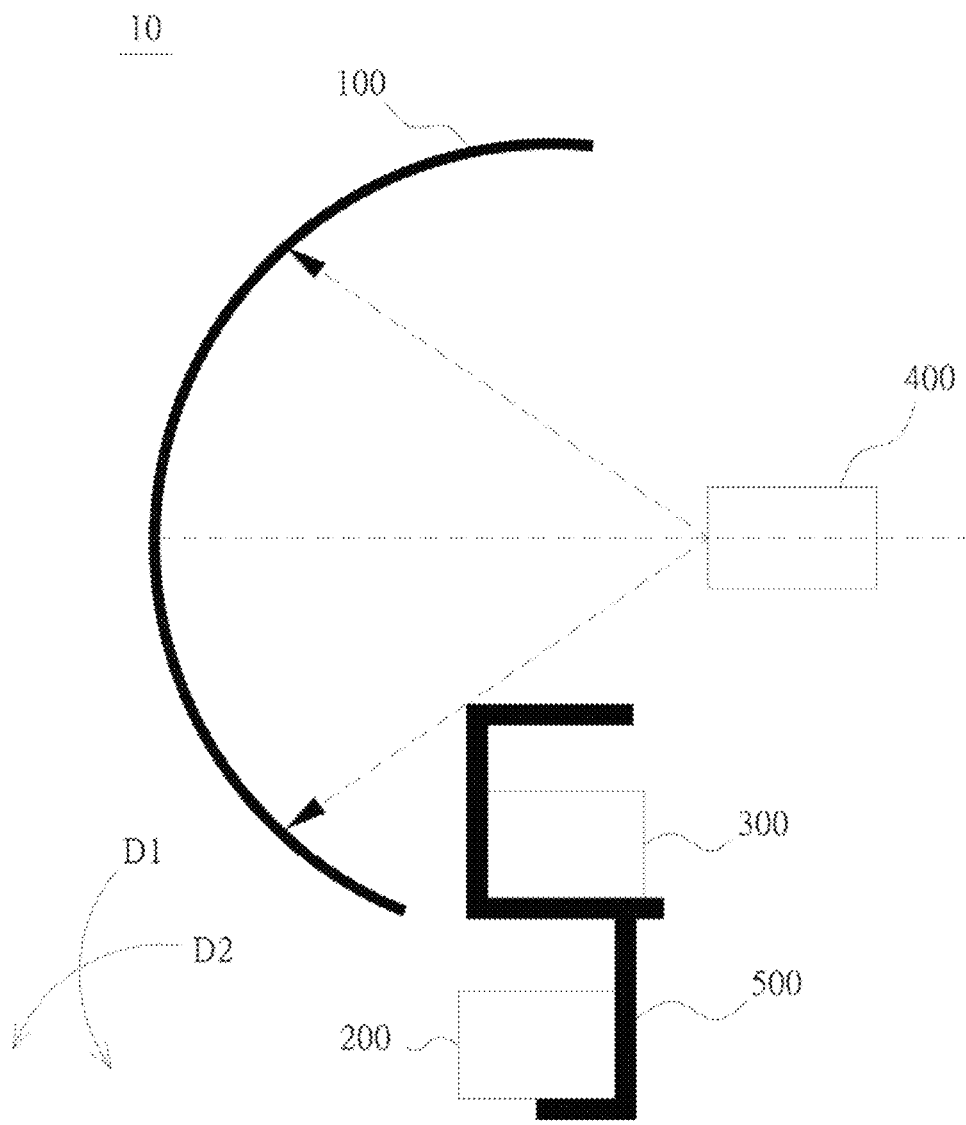

| | | | |
|---|---|---|---|
| 2003/0169627 A1* | 9/2003 | Liu | H04N 5/2627 |
| | | | 365/200 |
| 2005/0083491 A1* | 4/2005 | Suzuki | G03B 21/28 |
| | | | 348/E5.142 |
| 2007/0100498 A1* | 5/2007 | Matsumoto | G05D 1/024 |
| | | | 701/23 |
| 2011/0015486 A1* | 1/2011 | Yamamoto | H04N 13/363 |
| | | | 600/109 |
| 2011/0136581 A1* | 6/2011 | Cortelyou | A63G 31/00 |
| | | | 472/131 |
| 2012/0287407 A1* | 11/2012 | De Paor | G03B 37/06 |
| | | | 353/30 |
| 2014/0063469 A1* | 3/2014 | Folcik | H04N 5/222 |
| | | | 353/94 |
| 2014/0235362 A1* | 8/2014 | Fox | E04B 1/3211 |
| | | | 52/9 |
| 2015/0217451 A1* | 8/2015 | Harada | B25J 9/1612 |
| | | | 901/47 |
| 2015/0220171 A1* | 8/2015 | Cho | G06F 3/0488 |
| | | | 345/173 |
| 2015/0268738 A1* | 9/2015 | Song | H05K 1/184 |
| | | | 345/168 |
| 2016/0346693 A1* | 12/2016 | Minato | G03B 21/10 |
| 2018/0356718 A1* | 12/2018 | Nashida | G03B 21/562 |

* cited by examiner

ROBOTIC SYSTEM HAVING NON-PLANAR INNER PROJECTION OF MOVABLE MECHANISM

FIELD OF THE INVENTION

The present invention relates to a system of inner projection to a non-planar projection plane, in particular, a system of inner projection to a movable and non-planar projection plane.

BACKGROUND OF THE INVENTION

In recent years, inner projection technology or micro-projection technology has been widely used, such as various projectors or digital cameras, etc. But it is mostly used in flat display devices, although a small number of them are used in curved display devices. Due to the purpose of use or various restrictions on the device, most of these curved display devices cannot be moved, thus limiting the scope of application.

SUMMARY OF THE INVENTION

The present invention provides a robotic system having non-planar inner projection of a movable mechanism, which comprises a non-planar projection surface, a first servo motor, a second servo motor and an inner projection element. The first servo motor is connected with the non-planar projection surface, and the non-planar projection surface is rotated synchronously along a first direction by the first servo motor. The second servo motor is connected with the non-planar projection surface, and the non-planar projection surface is rotated synchronously along a second direction by the second servo motor. The inner projection element is disposed relative to the non-planar projection surface, the inner projection element generates a target image, and the target image is projected onto the non-planar projection surface to form a display area, and the display area has a fixed boundary. The first servo motor, the second servo motor and the inner projection element are disposed on the support frame. When the non-planar projection surface is synchronously rotated along the first direction by the first servo motor and/or synchronously rotated along the second direction by the second servo motor, the inner projection element is also rotated synchronously with respect to the first direction and/or the second direction.

Preferably, the non-planar projection surface is made by plastic material.

Preferably, the non-planar projection surface is a spherical projection surface.

Preferably, the robotic system having non-planar inner projection of movable mechanism further comprises an optical refection element, the optical reflection element is arranged facing the non-planar projection surface at a first included angle, and the inner projection element reflects the target image to the non-planar projection surface via the optical reflection element. When the non-planar projection surface is rotated along the first direction and/or the second direction, the first included angle remains unchanged.

Preferably, the inner projection element is arranged facing the non-planar projection surface at a second included angle. When the non-planar projection surface is rotated along the first direction and/or the second direction, the second included angle remains unchanged.

Preferably, the target image is generated by an original image generated by the inner projection element after performing an indentation correction procedure on the original image.

Preferably, the inner projection element performing an algorithm modification procedure to the target image.

Preferably, the inner projection element has a lens corresponding to a curvature of the non-planar projection surface to correspondingly generate the target image.

The present invention further provides a robotic system having non-planar inner projection of movable mechanism, which comprises a non-planar projection surface, a servo motor, an inner projection element and a support frame. The servo motor is connected with the non-planar projection surface, and the non-planar projection surface is rotated synchronously along a direction by the servo motor. The inner projection element is disposed relative to the non-planar projection surface, the inner projection element generating a target image, and the target image is projected onto the non-planar projection surface to form a display area, and the display area has a fixed boundary. The servo motor and the inner projection element are disposed on the support frame. When the non-planar projection surface is synchronously rotated along the direction by the servo motor, the inner projection element is also rotated synchronously with respect to the direction.

Preferably, the non-planar projection surface is made by plastic material.

Preferably, the non-planar projection surface is a spherical projection surface.

Preferably, the robotic system having non-planar inner projection of movable mechanism further comprises an optical refection element, the optical reflection element is arranged facing the non-planar projection surface at a first included angle, and the inner projection element reflects the target image to the non-planar projection surface via the optical reflection element. When the non-planar projection surface is rotated along the first direction and/or the second direction, the first included angle remains unchanged.

Preferably, the inner projection element is arranged facing the non-planar projection surface at a second included angle. When the non-planar projection surface is rotated along the first direction and/or the second direction, the second included angle remains unchanged.

Preferably, the target image is generated by an original image generated by the inner projection element after performing an indentation correction procedure on the original image.

Preferably, the inner projection element performing an algorithm modification procedure to the target image.

Preferably, the inner projection element has a lens corresponding to a curvature of the non-planar projection surface to correspondingly generate the target image.

As mentioned above, the robotic system having non-planar inner projection of movable mechanism according to the present invention has below advantages:

This robotic system having non-planar inner projection of movable mechanism can be applied to a non-planar projection surface, and the non-planar projection surface can rotate relative to the inner projection element, which increases the application range of the inner projection technology.

This robotic system having non-planar inner projection of movable mechanism corrects the target image with complying indentation correction procedure, the algorithm modification procedure or using a lens corresponding to a curvature design of the non-planar projection surface, to generate a right target image onto the non-planar projection surface without image distortion.

DESCRIPTION OF THE DIAGRAMS

Figure 2:
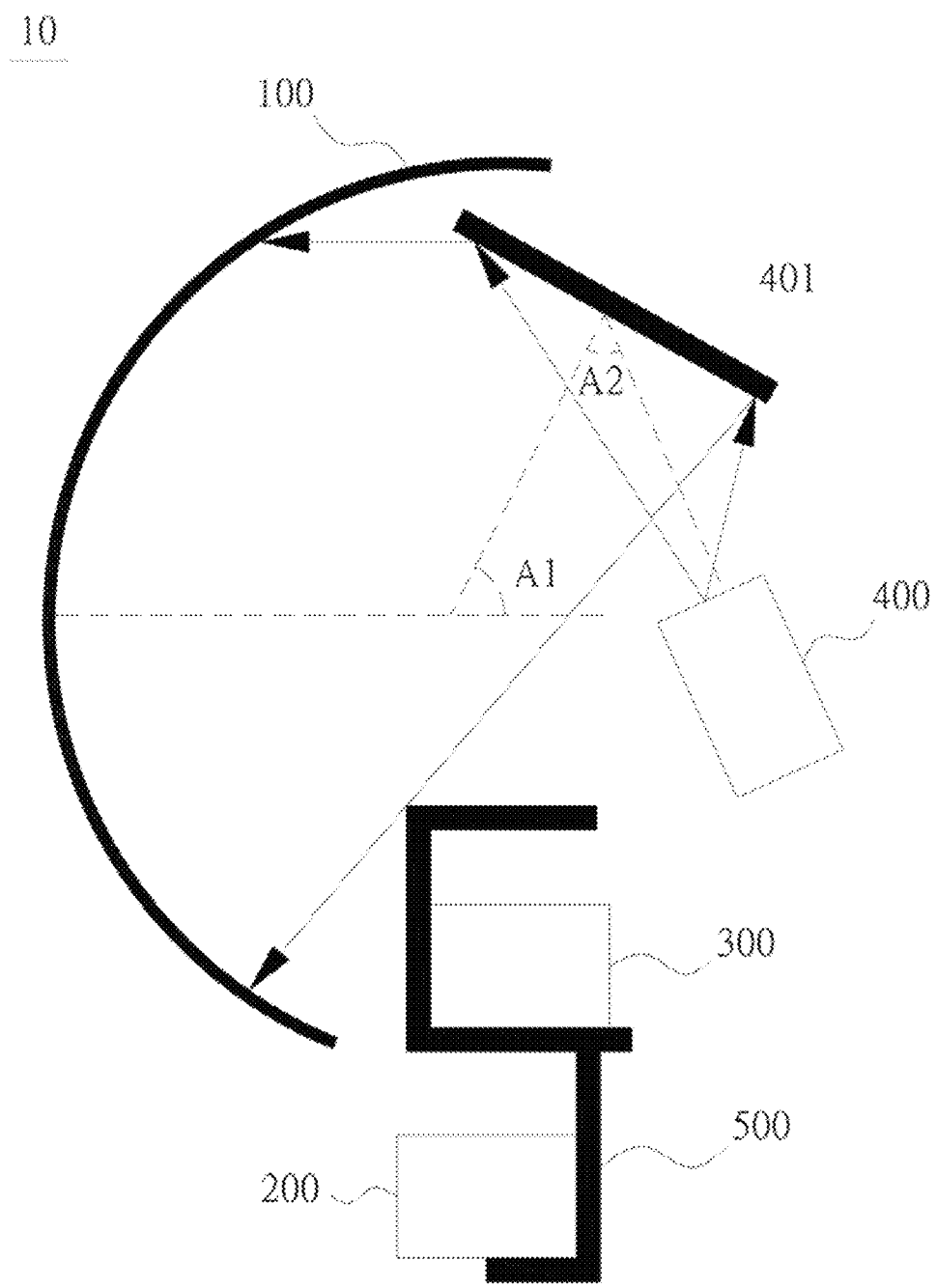

In order to make the technical features, content and advantages of the present invention and its achievable effects more obvious. It is easy to see that the present invention is combined with the drawings and described in detail in the form of an embodiment as follows:

FIG. 1 is an illustrative diagram of the robotic system having non-planar inner projection of movable mechanism according to embodiment of the present invention; and FIG. 2 is another illustrative diagram of the robotic system having non-planar inner projection of movable mechanism according to embodiment of the present invention.

DETAILED DESCRIPTION OF THE PREFERRED EMBODIMENTS

In order to help your examiners understand the technical features, content and advantages of the present invention and the effects that can be achieved, the present invention is combined with the drawings and described in detail in the form of embodiments as follows, and the figures used therein The main purpose of the formula is only for illustrative and auxiliary manual purposes, and may not be the true proportions and precise configuration after the implementation of the present invention. Therefore, the proportions and configuration relationships of the attached drawings should not be interpreted or limited to the actual implementation of the present invention. The scope of rights shall be stated first.

In the drawings, the thickness or width of layers, films, panels, regions, light guides, etc. is enlarged for clarity. Throughout the specification, the same reference numerals denote the same elements. It should be understood that when an element such as a layer, film, region, or substrate is referred to as being "on" or "connected" to another element, it can be directly on or connected to the other element, or Intermediate elements may also be present. Conversely, when an element is referred to as being "directly on" or "directly connected to" another element, there are no intervening elements. As used herein, "connection" can refer to a physical and/or electrical connection. Furthermore, "electrically connected" or "coupled" may mean that there are other elements between two elements. In addition, it should be understood that although the terms "first", "second", and "third" may be used herein to describe various elements, components, regions, layers and/or parts, they are used to refer to an element, component, Region, layer and/or part are distinguished from another element, component, region, layer and/or part. Therefore, it is only used for descriptive purposes, and cannot be understood as indicating or implying relative importance or its sequence relationship.

Please refer to FIG. 1, which is an illustrative diagram of the robotic system having non-planar inner projection of movable mechanism 10 according to embodiment of the present invention. The robotic system having non-planar inner projection of movable mechanism 10 comprises a non-planar projection surface 100, a first servo motor 200, a second servo motor 300 and an inner projection element 400. The first servo motor 200 is connected with the non-planar projection surface 100, and the non-planar projection surface 100 is rotated synchronously along a first direction D1 by the first servo motor 200. The second servo motor 300 is connected with the non-planar projection surface 100, and the non-planar projection surface 100 is rotated synchronously along a second direction D2 by the second servo motor 300. The inner projection element 400 is disposed relative to the non-planar projection surface 100, the inner projection element 400 generates a target image, and the target image is projected onto the non-planar projection surface 100 to form a display area, and the display area has a fixed boundary (For example, the fixed boundary is where the arrow of the ray drawn at one end of the inner projection element 400 in FIG. 1 points on the non-planar projection surface 100). The first servo motor 200, the second servo motor 300 and the inner projection element 400 are disposed on the support frame 500. When the non-planar projection surface 100 is synchronously rotated along the first direction D1 by the first servo motor 200 and/or synchronously rotated along the second direction D2 by the second servo motor 300, the inner projection element 400 is also rotated synchronously with respect to the first direction D1 and/or the second direction D2.

According to another embodiment of the present invention, the connecting manner of the first servo motor 200 and/or the second servo motor 300 with the non-planar projection surface 100 can be adjusted in various ways according to their configuration. For example, if the configuration is limited in an enclosed space, the transmission shaft can be used as the first servo motor 200 and/or the second servo motor 300 to connect to the non-planar projection surface 100. When the first servo motor 200 and/or the second servo motor 300 drive the transmission shaft, the transmission shaft drives the non-planar projection surface 100 to rotate along the first direction D1 and/or the second direction D2.

According to another embodiment of the present invention, when the non-planar projection surface 100 rotates along the first direction D1 and/or the second direction D2, the inner projection element 400 can stably project the target image to the area of the corresponding non-planar projection surface 100, the positions of the first servo motor 200, the second servo motor 300 and the inner projection element 400 on the support frame 500 need to be adjusted accordingly. For example, when the first servo motor 200, the second servo motor 300, and the inner projection element 400 are arranged on the support frame 500, the inner projection element 400 uses an extension structure (not shown in the figure) of the support frame 500 to fixed with the main body of the support frame 500, so that when the first servo motor 200 and/or the second servo motor 300 drive the non-planar projection surface 100 rotate, the inner projection element 400 can synchronously rotate with respect to the corresponding rotating angle of the first servo motor 200 and/or the second servo motor. Hence, the target image is projected by the inner projection element 400 can be correctly projected onto the corresponding area of the non-planar projection surface 100. The arrangement of the first servo motor 200, the second servo motor 300, and the inner projection element 400 on the support frame 500 mentioned in this embodiment, as long as the internal projection element 400 and the first servo motor 200 and the second servo motor 300 can achieve synchronous rotation, it is applicable to this embodiment.

According to the embodiment of the present invention, it is considered that if a curved display panel is chosen as a non-planar projection surface, it may be necessary to further deal the optical problems such as aberration or chromatic aberration of the target image, and cost considerations. So the non-planar projection surface 100 is made of plastic material, and a layer of Nano material is sprayed on the surface to increase light transmittance, color uniformity, black and white contrast and viewing angle.

According to the embodiment of the present invention, for the complexity of the image correction required for the target image projected on the non-planar projection surface 100, the non-planar projection surface 100 is a spherical projection surface, but the present invention is not limited to this embodiment. For the non-planar projection surface 100 which is different from the spherical projection surface, the target image on the spherical projection surface also be fine with slight adjustment.

According to an embodiment of the present invention, in order to obtain the maximum rotation range, the first servo motor 200 and the second servo motor 300 are rotated synchronously with the non-planar projection surface 100 by a transmission device, and then the support frame 500 is used to further achieving synchronous rotation of the four components which include the inner projection element 400, the first servo motor 200, the second servo motor 300, and the non-planar projection surface 100. Therefore, the rotation of the non-planar projection surface 100 along the first direction D1 and/or the second direction D2 would not be restricted.

Please refer to FIG. 2, which is another illustrative diagram of the robotic system having non-planar inner projection of movable mechanism 10 according to embodiment of the present invention. As shown in the figure, the robotic system 10 having non-planar projection of movable mechanism further includes an optical reflection element 401. The optical reflection element 401 is arranged facing the non-planar projection surface 100 at a first included angle A1, wherein the projection element 400 reflects the target image on the non-planar projection surface 100 via the optical reflection element 401, and the optical reflection element 401 should be slightly adjusted its setting position to put the target image properly be projected onto a corresponding display area of the non-planar projection surface 100 to corresponding to the non-planar projection surface 100 with different curvatures. When considering the size of the space occupied by the robotic system having non-planar inner projection of movable mechanism 10 of the present invention, or considering the optical characteristics of the inner projection element 400, the optical reflection element 401 can be used to increase the projecting path length of the target image in the same space.

According to the embodiment of the present invention, it is considered that when the non-planar projection surface 100 rotates along the first direction D1 and/or the second direction D2, because the inner projection element 400 rotates synchronously, the inner projection element 400 faces the optical reflection element 401 with a second included angle A2, to correctly project the target image to the display area corresponding to the non-planar projection surface 100. When the inner projection element 400 has different curvatures on the non-planar projection surface 100, the optical reflection element 401 needs to adjust the first included angle A1 to face the non-planar projection surface 100, so the second included angle A2 of the inner projection element 400 facing the light reflection element 401 needs to be adjusted accordingly.

Once the above-mentioned first included angle A1 and second included angle A2 are confirmed, when the non-planar projection surface 100 rotates, the relative positions of the non-planar projection surface 100, the optical reflection element 401, and the inner projection element 400 are maintained without change, so that the display area can maintain a fixed boundary.

Since the target image is projected on the non-planar projection surface 100, if the target image is not corrected, the image projected on the non-planar projection surface 100 will be an expanded and blurred image. There are three correction methods, one of which is that before the inner projection element 400 generates the target image projected onto the non-planar projection surface 100, the inner projection element 400 performs an indentation correction procedure on the original image generated by the inner projection element 400, and the indentation correction procedure has been performed. The original image is the target image generated by the internal projection element 400.

Taking the above-mentioned indentation correction procedure into consideration that the target image is projected on the non-planar projection surface 100. For example, in the present invention, it may be a spherical projection surface, so this indentation correction procedure is performed to the original image which is generated by the inner projection element 400, and an image corresponding to the indentation correction process is the target image. This image itself is an indented image. If it is projected onto a flat projection surface, an incorrect blurred image, but projected onto the spherical projection surface can get a clear target image. The present invention is not limited to this embodiment. When the non-planar projection surface 100 is a projection surface with various curvatures, different correction procedures can be executed correspondingly to correct the original image, and it does not have to be an indentation correction procedure, as long as it can be applicable to the present invention to correctly project the target image on projection surfaces with different curvatures.

According to an embodiment of the present invention, another method to correct the target image is to use the internal projection element 400 to further execute an algorithm modification procedure on the target image. The difference from the above-mentioned correction procedure is that the target image is not an indented image. The target image can be correctly projected on a flat projection surface. However, because the present invention is projected on a non-planar projection surface 100 with different curvatures, The target image is an incorrect blurred image on the non-planar projection surface 100, so corresponding to the non-planar projection surface 100 with different curvatures, different degrees of algorithm correction procedures are executed to obtain the image correctly projected on the non-planar projection surface 100.

According to the embodiment of the present invention, a third correction method is different from the first two methods executed by software, but adjusts the lens design corresponding to the non-planar projection surface 100 with different curvatures. For example, it is designed to resemble a fisheye lens, so that the original image generated by the inner projection element 400 is the target image without any adjustment.

According to an embodiment of the present invention, the aforementioned robotic system having non-planar inner projection of movable mechanism 10 can be applied to any non-planar inner projection system with a movable mechanism, which includes a non-planar projection surface 100, a servo motor 200 (or 300) and internal projection element 400. The servo motor 200 (or 300) is connected to the non-planar projection surface 100, and the non-planar projection surface 100 can be rotated synchronously by the servo motor 200 (or 300). The internal projection element 400 is set relative to the non-planar projection surface 100. The internal projection element 400 generates a target image and projects it onto the non-planar projection surface 100 to form a display area, and the display area has a fixed boundary (For example, the fixed boundary is where the arrow of the ray drawn at one end of the inner projection element 400 in FIG. 1 points on the non-planar projection surface 100). The servo motor 200 (or 300) and the inner projection element 400 are arranged on the supporting frame 500. When the non-planar projection surface 100 is synchronously rotated by the servo motor 200 (or 300), the inner projection element 400 rotates correspondingly.

According to the embodiment of the present invention, the components included in the above-mentioned robotic system having non-planar inner projection of movable mechanism, their connection relations and various operations, have been described in the robotic system having non-planar inner projection of movable mechanism 10, no more repeat them here.

What is claimed is:

1. A robotic system having non-planar inner projection of movable mechanism, comprising:
    a non-planar projection surface;
    a first servo motor, the first servo motor connected with the non-planar projection surface, and the non-planar projection surface rotated synchronously along a first direction by the first servo motor;
    a second servo motor, the second servo motor connected with the non-planar projection surface, and the non-planar projection surface rotated synchronously along a second direction by the second servo motor
    an inner projection element, the inner projection element disposed relative to the non-planar projection surface, the inner projection element generating a target image, and the target image is projected onto the non-planar projection surface to form a display area, and the display area has a fixed boundary; and
    a support frame;
    wherein the first servo motor, the second servo motor and the inner projection element are disposed on the support frame, when the non-planar projection surface is synchronously rotated along the first direction by the first servo motor and/or synchronously rotated along the second direction by the second servo motor, the inner projection element is also rotated synchronously with respect to the first direction and/or the second direction.

2. The robotic system having non-planar inner projection of movable mechanism according to claim 1, wherein the non-planar projection surface is made by plastic material.

3. The robotic system having non-planar inner projection of movable mechanism according to claim 1, wherein the non-planar projection surface is a spherical projection surface.

4. The robotic system having non-planar inner projection of movable mechanism according to claim 1, further comprises a optical refection element, the optical reflection element is arranged facing the non-planar projection surface at a first included angle, the inner projection element reflects the target image to the non-planar projection surface via the optical reflection element, and when the non-planar projection surface is rotated along the first direction and/or the second direction, the first angle remains unchanged.

5. The robotic system having non-planar inner projection of movable mechanism according to claim 4, wherein the inner projection element is arranged facing the non-planar projection surface at a second included angle, when the non-planar projection surface is rotated along the first direction and/or the second direction, the second included angle remains unchanged.

6. The robotic system having non-planar inner projection of movable mechanism according to claim 5, wherein the target image is generated by an original image generated by the inner projection element after performing an indentation correction procedure on the original image.

7. The robotic system having non-planar inner projection of movable mechanism according to claim 5, wherein the inner projection element performing an algorithm modification procedure to the target image.

8. The robotic system having non-planar inner projection of movable mechanism according to claim 5, wherein the inner projection element has a lens corresponding to a curvature of the non-planar projection surface to correspondingly generate the target image.

9. A robotic system having non-planar inner projection of movable mechanism, comprising:
    a non-planar projection surface;
    a servo motor, the servo motor connected with the non-planar projection surface, and the non-planar projection surface rotated synchronously along a direction by the servo motor;
    an inner projection element, the inner projection element disposed relative to the non-planar projection surface, the inner projection element generating a target image, and the target image is projected onto the non-planar projection surface to form a display area, and the display area has a fixed boundary; and
    a support frame;
    wherein the servo motor and the inner projection element are disposed on the support frame, when the non-planar projection surface is synchronously rotated along the direction by the servo motor, the inner projection element is also rotated synchronously with respect to the direction.

10. The robotic system having non-planar inner projection of movable mechanism according to claim 9, wherein the non-planar projection surface is made by plastic material.

11. The robotic system having non-planar inner projection of movable mechanism according to claim 9, wherein the non-planar projection surface is a spherical projection surface.

12. The robotic system having non-planar inner projection of movable mechanism according to claim 9, further comprises a optical refection element, the optical reflection element is arranged facing the non-planar projection surface at a first included angle, the inner projection element reflects the target image to the non-planar projection surface via the optical reflection element, and when the non-planar projection surface is rotated along the first direction and/or the second direction, the first included angle remains unchanged.

13. The robotic system having non-planar inner projection of movable mechanism according to claim 12, wherein the inner projection element is arranged facing the non-planar projection surface at a second included angle, when the non-planar projection surface is rotated along the first direction and/or the second direction, the second included angle remains unchanged.

14. The robotic system having non-planar inner projection of movable mechanism according to claim 13, wherein the target image is generated by an original image generated by the inner projection element after performing an indentation correction procedure on the original image.

15. The robotic system having non-planar inner projection of movable mechanism according to claim 13, wherein the inner projection element performing an algorithm modification procedure to the target image.

16. The robotic system having non-planar inner projection of movable mechanism according to claim 13, wherein the inner projection element has a lens corresponding to a curvature of the non-planar projection surface to correspondingly generate the target image.

* * * * *